Patented Jan. 12, 1954

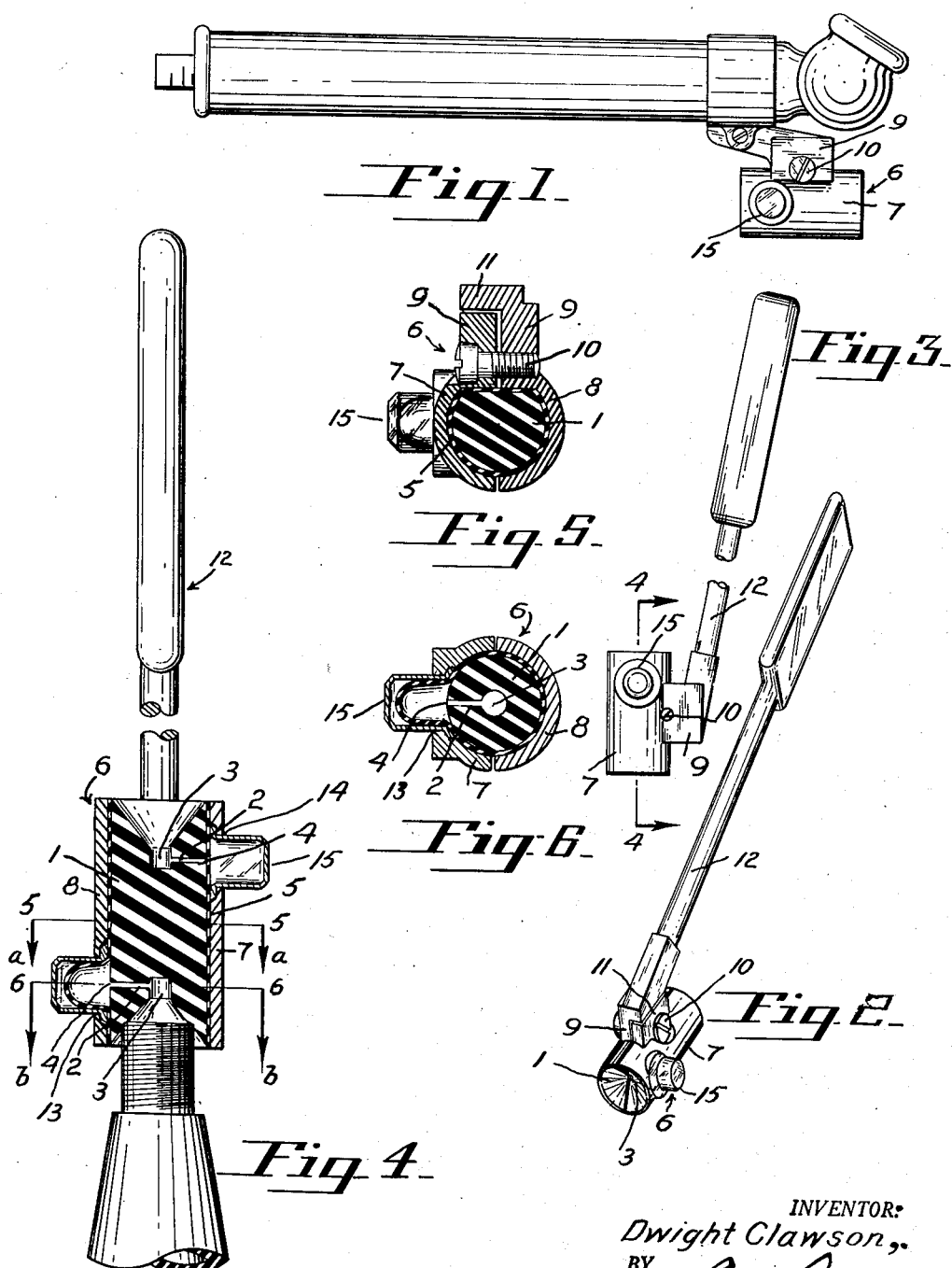

2,665,580

UNITED STATES PATENT OFFICE 2,665,580

VALVE LEAK DETECTOR

Dwight Clawson, Clatskanie, Oreg.

Application October 30, 1952, Serial No. 317,720

5 Claims. (Cl. 73—48)

This invention relates to improvements in valve leak detectors for pneumatic tires.

The object of the invention is to provide in an air leak detector a simple and easily applied device to detect minor or slow leaks in pneumatic tires.

A further object of the invention is to provide an air leak detector which will indicate the leak by a resilient blister and thus make a visible signal that air is escaping.

A still further object of the invention is to provide a transparent shield to protect the visible signal against rupture and limit the size of the signal.

Another object of the invention is to provide an air leak detector wherein escaping air passes through right angular ducts formed in a resilient elongated body, the inlet ends of the ducts being at the end, and the exits terminating on the side of the resilient body, and a visible signal at the exits to indicate a leak.

A still further object of the invention is to provide a leak detector wherein a resilient elongated body is provided with an air exit duct on its outer surface, and resilient means surrounding the resilient body to form a visible signal, with means for clamping the signal means in place, together with an extended handle for holding the detector on a valve while testing same for a leak.

Other objects and advantages will obviously be apparent from the following description and claims and the disclosure in the accompanying drawing.

In the drawing:

Figure 1 is a side view of the leak detector attached to an ordinary air gauge, the latter serving as a handle when applying the device to a valve stem.

Figure 2 is a perspective view of the detector provided with a fixed handle.

Figure 3 is a side elevation of the detector.

Figure 4 is a vertical section taken on line 4—4 of Figure 3 looking in the direction of the arrows.

Figure 5 is a horizontal section taken on the line 5—5 of Figure 4 looking in the direction of the arrows a—a.

Figure 6 is a similar view taken on the line 6—6 of Figure 4 looking in the direction of the arrows b—b.

Numeral 1 indicates an elongated resilient body portion, preferably in cylindrical form and formed with two right angle ducts 2—2. The inlets 3—3 of these ducts are at the end, and the exits 4—4 are at the periphery of the resilient body portion. The inlets 3—3 are flared outwardly for convenience in fitting the device to valve stems.

Surrounding the outside of the resilient body portion and covering the exits 4—4 is a thin sheet of resilient material 5, preferably rubber.

6 indicates a two-part clamp to secure the thin sheet of rubber to the resilient body portion. The clamp comprises two semi-circular sections 7 and 8, each formed with a perforated lug 9, through which passes a screw 10 to secure the clamp sections together. The lug 9 of section 7 has an undercut portion to form a flange 11, and from this lug and extending at an angle from the clamp is a handle 12. The lug 9 of the section 8 fits snugly under the flange 11, which with the bolt 10 securely holds the two sections together. The section 7 near one end is formed with an opening 13, and the section 8 near its outer end is formed with a similar opening 14, the openings being on opposite sides of the clamp and in alignment with the exit openings of the ducts. The purpose of providing openings at opposite ends of the body portion is to make it convenient to apply the detector to a valve stem at either end of the device.

Fitting in the openings 13 and 14 and over the thin sheet of rubber 5 are transparent bulbs 15—15, which are flanged at their inner ends and secured between the clamp sections and the body portion.

While the detector is shown to be applied to a valve stem at either end of the resilient body portion, it is evident the device is operable with but one right angle duct. However, it is more practical and convenient to arrange the ducts at opposed ends of the body to reach a valve which could not be conveniently reached if but a single duct was used.

When applying the detector, as shown in Figure 4, the inlet end of the angular duct in the end of the body portion 1 is fitted over the stem of the valve, and if there is an air leak in the tire, the air will pass through the angular duct and force the portion of the rubber sheet opposite the exit of the duct and form a blister in the rubber sheet and thus visibly signal that a leak is present. When the blister is formed, it is protected by the transparent bulb to insure that it will not be accidentally punctured by striking an object. The bulb also limits the size of the blister and thus prevents the rubber being ruptured.

It is obvious the resilient rubber body may be of any cross section shape.

What I claim is:

1. A valve leak detector, comprising an elongated rubber body portion formed on one end with an angular shaped duct terminating at one end in an air inlet at the end of the resilient body portion to fit over a valve stem, and terminating at its opposite end at the side of the resilient body portion to provide an air exit, a thin sheet of rubber extending over the exit end of the duct at the outer surface of the resilient body portion, and a clamp over the resilient body portion and the thin rubber sheet the clamp having an opening in alignment with the air exit, and a handle extending from the clamp, whereby when the detector is fitted over a valve stem and air is leaking from the valve, the escaping air will blow the thin rubber through the opening in the clamp and form a blister.

2. A valve leak detector as defined in claim 1, wherein a transparent bulb incloses the area around the exit opening to protect the thin rubber sheet and form a casing around the blister when formed.

3. A valve leak detector as defined in claim 1, wherein the thin rubber sheet completely embraces the resilient body portion, and the clamp comprises two sections to clamp the thin rubber sheet to the resilient body portion, each clamp having a lug, a screw passing through the lug to secure the two sections of the clamp together, the handle extending from one of the lugs.

4. A valve leak detector, comprising an elongated cylindrical rubber body portion formed at each end with an angular shaped duct, each duct terminating in an air inlet at the end of the resilient body portion to fit over a valve stem and terminating at its opposite end at the periphery of the resilient body portion to provide an air exit, a thin sheet of rubber embracing the resilient body portion and over the exit openings, a two-part clamp embracing the thin sheet of rubber and resilient body portion one of said clamp sections having openings in alignment with the exit ends of the ducts, each clamp section having a lug, one said lug having a recess to form an overhanging inclined flange to receive the lug on the other clamp section, a handle extending from the lug having the overhanging flange, the handle extending at an angle from the clamp, whereby a valve when at the upper or lower portion of a wheel can be tested, and transparent bulbs secured to the clamp sections adjacent the exit openings, whereby when one of the inlet ducts is placed over a valve stem and a leak occurs, the thin sheet of rubber will be blown outwardly through the adjacent opening in the casing and form a blister in the bulb surrounding the opening.

5. A valve leak detector, comprising an elongated rubber body formed on one end with a recess to receive a valve stem, an angular shaped duct formed in one end of the elongated rubber body, said duct communicating with the recess in the end and extending to the outside of said elongated rubber body, a two-part clamp to receive the elongated rubber body, an opening formed in the two part clamp; a handle on the periphery of the elongated rubber body and from the clamp, a thin sheet of rubber extending over the duct exit and over the opening in the clamp, whereby air escaping from a valve inserted in the recess and through the duct will blow the thin rubber over the outlet through the opening in the clamp and form a blister.

DWIGHT CLAWSON.

References Cited in the file of this patent

UNITED STATES PATENTS

| Number | Name | Date |
| --- | --- | --- |
| 1,313,493 | Lokey | Aug. 19, 1919 |
| 1,388,443 | Stewart et al. | Aug. 23, 1921 |
| 1,472,712 | Altz | Oct. 30, 1923 |
| 1,586,127 | Storm | May 25, 1926 |
| 2,534,830 | Philo | Dec. 19, 1950 |